(12) United States Patent
Jang et al.

(10) Patent No.: US 12,546,893 B2
(45) Date of Patent: Feb. 10, 2026

(54) METHOD AND APPARATUS FOR TRACKING OBJECT USING LIDAR SENSOR AND RECORDING MEDIUM STORING PROGRAM TO EXECUTE THE METHOD

(71) Applicants: Hyundai Motor Company, Seoul (KR); Kia Corporation, Seoul (KR)

(72) Inventors: Yoon Ho Jang, Gyeonggi-do (KR); Soo Kyung Ryu, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 962 days.

(21) Appl. No.: 17/728,387

(22) Filed: Apr. 25, 2022

(65) Prior Publication Data
US 2022/0357450 A1   Nov. 10, 2022

(30) Foreign Application Priority Data
May 4, 2021   (KR) ........................ 10-2021-0057745

(51) Int. Cl.
G01S 17/66   (2006.01)
G01S 7/4865   (2020.01)
G01S 17/931   (2020.01)

(52) U.S. Cl.
CPC ............ *G01S 17/66* (2013.01); *G01S 7/4865* (2013.01); *G01S 17/931* (2020.01)

(58) Field of Classification Search
USPC ......................................................... 382/103
See application file for complete search history.

(56) References Cited

U.S. PATENT DOCUMENTS

| | | | | |
|---|---|---|---|---|
| 2019/0204423 | A1* | 7/2019 | O'Keeffe | ................ G01S 17/89 |
| 2020/0117947 | A1* | 4/2020 | Mei | ............ G06T 7/11 |
| 2021/0216814 | A1* | 7/2021 | Li | ............ G06V 10/763 |
| 2021/0223373 | A1* | 7/2021 | Korobkin | .............. G01S 17/931 |

* cited by examiner

*Primary Examiner* — Darryl V Dottin
(74) *Attorney, Agent, or Firm* — Fox Rothschild LLP

(57) ABSTRACT

A method of tracking an object using a LiDAR sensor includes determining, by an information determiner, based on the spacing distance between a target point and a valid neighboring point disposed adjacent to the target point in the same layer as the target point, among first points acquired by the LiDAR sensor, noise information indicating whether the target point is a noise point; and clustering, by a clustering unit, the first points using the noise information.

20 Claims, 12 Drawing Sheets

METHOD AND APPARATUS FOR TRACKING OBJECT USING LIDAR SENSOR AND RECORDING MEDIUM STORING PROGRAM TO EXECUTE THE METHOD

CROSS-REFERENCE TO RELATED APPLICATION

This application claims under 35 U.S.C. § 119(a) the benefit of Korean Patent Application No. 10-2021-0057745, filed on May 4, 2021, the entire contents of which are incorporated by reference herein.

BACKGROUND

(a) Technical Field

The present disclosure relates to a method and apparatus for tracking an object using a LiDAR sensor and a recording medium storing a program to execute the method.

(b) Description of the Related Art

Various technologies are being developed for autonomous driving of vehicles. For example, information on a target vehicle may be obtained using a light detection and ranging (LiDAR) sensor, and an autonomous driving function of a vehicle may be supported using the obtained information. An autonomous driving function of a vehicle is becoming increasingly dependent on information obtained by the LiDAR sensor. However, due to the characteristics of the LiDAR sensor, incorrect points are generated due to floating particles in the air, such as snow or rain, or due to noise generated by the LiDAR sensor itself, thus deteriorating the accuracy of recognition of an object. Therefore, research for solving this problem is underway.

SUMMARY

Accordingly, embodiments are directed to a method and apparatus for tracking an object using a LiDAR sensor and a recording medium storing a program to execute the method that substantially obviate one or more problems due to limitations and disadvantages of the related art.

Embodiments provide a method and apparatus for tracking an object using a LiDAR sensor, which exhibit excellent object-tracking performance even in the presence of various kinds of noise, and a recording medium storing a program to execute the method.

However, the objects to be accomplished by the embodiments are not limited to the above-mentioned objects, and other objects not mentioned herein will be clearly understood by those skilled in the art from the following description.

A method of tracking an object using a LiDAR sensor according to an embodiment may include determining, based on the spacing distance between a target point and a valid neighboring point disposed adjacent to the target point in the same layer as the target point, among first points acquired by the LiDAR sensor, noise information indicating whether the target point is a noise point, and clustering the first points using the noise information.

For example, the determining the noise information may include (a) selecting a noise determination region in which whether the first points are noise points is to be determined, (b) selecting valid third points from among second points present in the noise determination region, among the first points, and (c) determining the noise information based on the spacing distance between the target point and the neighboring point when the neighboring point is a valid point, the target point and the neighboring point being the third points.

For example, step (a) may include determining the noise determination region according to the number of fourth points temporarily determined to be first noise points generated due to floating particles in the air.

For example, the size of the noise determination region may be determined in proportion to the number of the fourth points.

For example, the method may further include determining validity of each of the first points used to select the third points in step (b), extracting points present in a region of interest from the first points as the fourth points, checking the number of the fourth points, and temporarily determining that the fourth points are the first noise points when the number of the extracted points is greater than a threshold number.

For example, the region of interest may include a top region, located above a host vehicle equipped with the LiDAR sensor, and a peripheral region, located near the top region.

For example, the method may further include determining validity of each of the first points used to select the third points in step (b), and step (a) may include selecting, according to the type of the LiDAR sensor, the noise determination region in which whether the noise points are second noise points generated due to the LiDAR sensor is to be determined.

For example, step (c) may include checking whether the neighboring point is the valid point, obtaining the spacing distance when the neighboring point is the valid point, checking whether the spacing distance is greater than a threshold distance, and determining the noise information indicating that the target point is the noise point when the spacing distance is greater than the threshold distance. Step (b) and step (c) may be performed on all of the second points.

A method of tracking an object using a LiDAR sensor according to another embodiment may include determining, based on a first spacing distance between a first target point and a valid first neighboring point disposed adjacent to the first target point in the same layer as the first target point, among first points acquired by the LiDAR sensor, first noise information indicating whether the first target point is a first noise point generated due to floating particles in the air, determining, based on a second spacing distance between a second target point and a valid second neighboring point disposed adjacent to the second target point in the same layer as the second target point, among the first points, second noise information indicating whether the second target point is a second noise point generated due to the LiDAR sensor, and clustering the first points using the first noise information and the second noise information.

For example, the determining the first noise information may include (a1) selecting a first noise determination region in which whether the first points are first noise points generated due to floating particles in the air is to be determined, (b1) selecting valid third points from among second points present in the first noise determination region, among the first points, and (c1) determining the first noise information based on the first spacing distance between the first target point and the first neighboring point when the first neighboring point is a valid point, the first target point and the first neighboring point being the third points.

For example, the determining the first noise information may further include extracting points present in a region of interest from the first points as fourth points, checking the number of the fourth points, and temporarily determining that the fourth points are the first noise points when the number of the extracted points is greater than a threshold number.

For example, step (c1) may include checking whether the first neighboring point is the valid point, obtaining the first spacing distance when the first neighboring point is the valid point, checking whether the first spacing distance is greater than a first threshold distance, and determining the first noise information indicating that the first target point is the first noise point when the first spacing distance is greater than the first threshold distance. Step (b1) and step (c1) may be performed on all of the second points.

For example, the determining the second noise information may include (a2) selecting a second noise determination region in which whether the first points are second noise points generated due to the LiDAR sensor is to be determined, (b2) selecting valid third points from among second points present in the second noise determination region, among the first points, and (c2) determining the second noise information based on the second spacing distance between the second target point and the second neighboring point when the second neighboring point is a valid point, the second target point and the second neighboring point being the third points.

For example, the method may further include determining validity of each of the first points used to select the third points.

For example, step (c2) may include checking whether the second neighboring point is the valid point, obtaining the second spacing distance when the second neighboring point is the valid point, checking whether the second spacing distance is greater than a second threshold distance, and determining the second noise information indicating that the second target point is the second noise point when the second spacing distance is greater than the second threshold distance. Step (b2) and step (c2) may be performed on all of the second points.

For example, the second noise information may be determined with respect to a point other than a point determined to be the first noise point, among the first points.

For example, the first noise information may be determined with respect to a point other than a point determined to be the second noise point, among the first points.

An apparatus for tracking an object using a LiDAR sensor according to still another embodiment may include an information determiner configured to determine, based on the spacing distance between a target point and a valid neighboring point disposed adjacent to the target point in the same layer as the target point, among first points acquired by the LiDAR sensor, noise information indicating whether the target point is a noise point, and a clustering unit configured to cluster the first points using the noise information.

An apparatus for tracking an object using a LiDAR sensor according to still another embodiment may include a first information determiner configured to determine, based on a first spacing distance between a first target point and a valid first neighboring point disposed adjacent to the first target point in the same layer as the first target point, among first points acquired by the LiDAR sensor, first noise information indicating whether the first target point is a first noise point generated due to floating particles in the air, a second information determiner configured to determine, based on a second spacing distance between a second target point and a valid second neighboring point disposed adjacent to the second target point in the same layer as the second target point, among the first points, second noise information indicating whether the second target point is a second noise point generated due to the LiDAR sensor, and a clustering unit configured to cluster the first points using the first noise information and the second noise information.

According to still another embodiment, a recording medium in which a program for executing a method of tracking an object using a LiDAR sensor is recorded may store a program to implement a function of determining, based on the spacing distance between a target point and a valid neighboring point disposed adjacent to the target point in the same layer as the target point, among first points acquired by the LiDAR sensor, noise information indicating whether the target point is a noise point, and a function of clustering the first points using the noise information. The recording medium may be read by a computer system.

According to still another embodiment, a recording medium in which a program for executing a method of tracking an object using a LiDAR sensor is recorded may store a program to implement a function of determining, based on a first spacing distance between a first target point and a valid first neighboring point disposed adjacent to the first target point in the same layer as the first target point, among first points acquired by the LiDAR sensor, first noise information indicating whether the first target point is a first noise point generated due to floating particles in the air, a function of determining, based on a second spacing distance between a second target point and a valid second neighboring point disposed adjacent to the second target point in the same layer as the second target point, among the first points, second noise information indicating whether the second target point is a second noise point generated due to the LiDAR sensor, and a function of clustering the first points using the first noise information and the second noise information. The recording medium may be read by a computer system.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Figure 1:
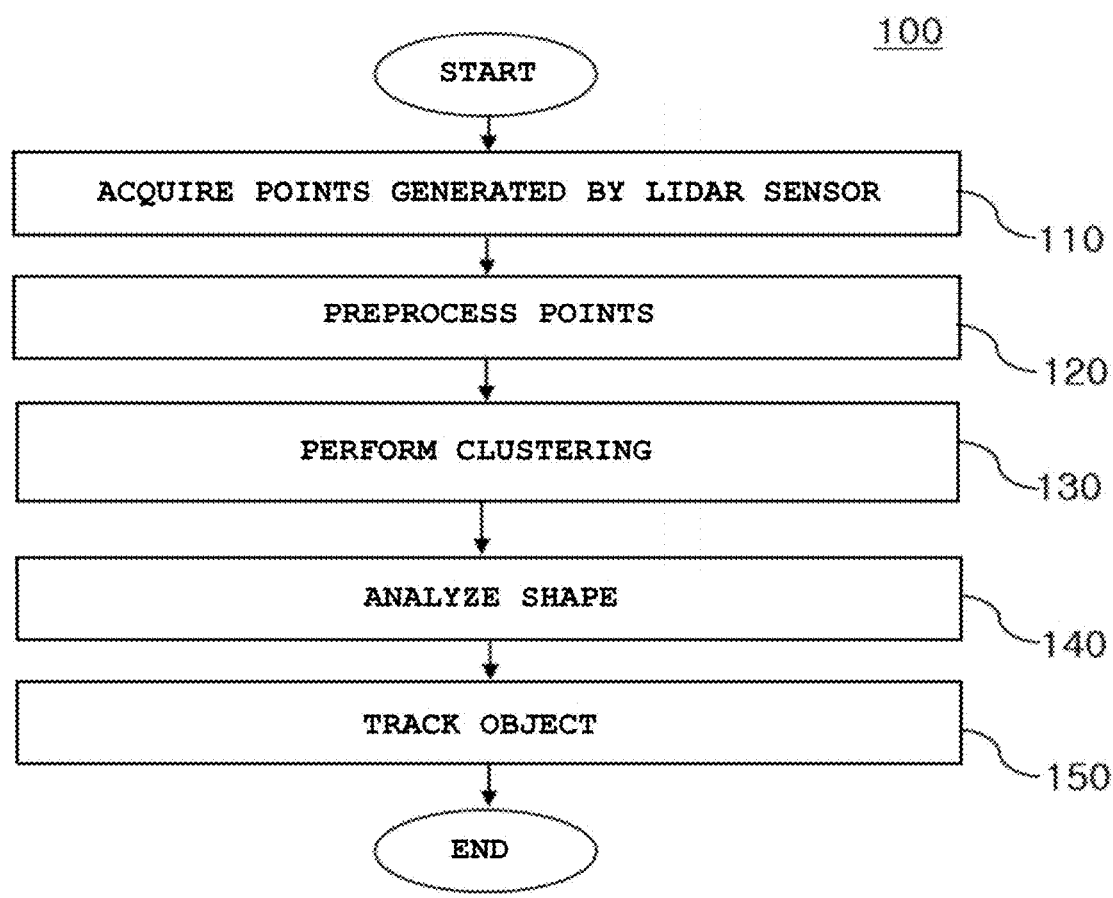
FIG. 1 is a flowchart showing an object-tracking method according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present disclosure will now be described more fully hereinafter with reference to the accompanying drawings, in which various embodiments are shown. The examples, however, may be embodied in many different forms, and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a method 100 and apparatus 1000 for tracking an object using a light detection and ranging (LiDAR) sensor and a recording medium storing a program to execute the method 100 according to embodiments will be described with reference to the accompanying drawings.

The method 100 and apparatus 1000 for tracking an object using the LiDAR sensor and the recording medium storing a program to execute the method 100 will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiments are not limited thereto. That is, according to another embodiment, the x-axis, the y-axis, and the z-axis may intersect each other obliquely.

Figure 2:
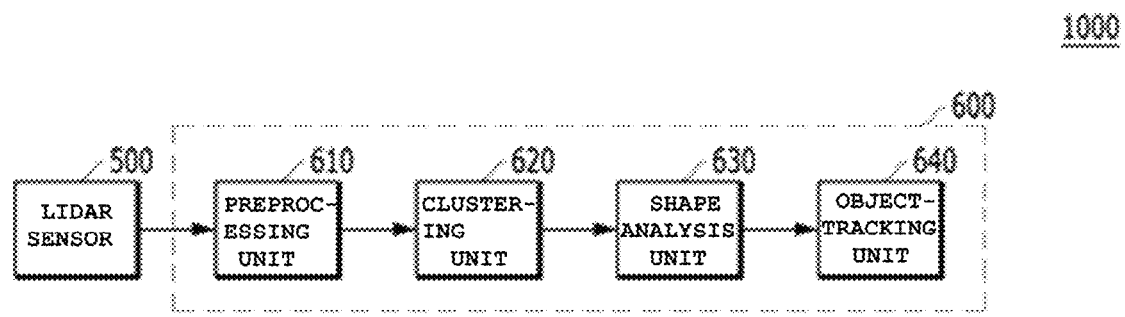
FIG. 2 is a schematic block diagram of an object-tracking apparatus according to an embodiment.

FIG. 1 is a flowchart showing an object-tracking method 100 according to an embodiment, and FIG. 2 is a schematic block diagram of an object-tracking apparatus 1000 according to an embodiment.

The object-tracking method 100 shown in FIG. 1 will be described as being performed by the object-tracking apparatus 1000 shown in FIG. 2, but the embodiments are not limited thereto. That is, according to another embodiment, the object-tracking method 100 shown in FIG. 1 may also be performed by an apparatus configured differently from the object-tracking apparatus 1000 shown in FIG. 2.

The object-tracking apparatus 1000 may include a LiDAR sensor 500 and a LiDAR controller 600.

According to the object-tracking method 100 according to the embodiment, points (or a point cloud or LiDAR data) generated by the LiDAR sensor 500 are first acquired (step 110).

The LiDAR sensor 500 may be provided in a plural number, and the plurality of LiDAR sensors 500 may be mounted at various positions on a vehicle (hereinafter referred to as a "host vehicle"). For example, the LiDAR sensors 500 may be disposed at various positions on the host vehicle, such as at the roof, the front side portions, and the rear side portions of the host vehicle. However, the embodiments are not limited to any specific position at which the LiDAR sensor 500 is disposed in the host vehicle or to any specific number of LiDAR sensors 500.

For example, the LiDAR sensor 500 may fire (or radiate or emit) a single circular laser pulse (or laser beam) having a wavelength of 905 nm to 1550 nm to an object, and may measure the time taken for the laser pulse reflected from an object present within a measurement range to return, thereby sensing information on the object, for example, the distance from the LiDAR sensor 500 to the object, the orientation of the object, the speed of the object, the temperature of the object, the material distribution of the object, and the concentration characteristics of the object. Here, the object may be, for example, another vehicle, a person, or an obstacle present outside the host vehicle equipped with the LiDAR sensor 500. However, the embodiments are not limited to any specific type of object.

The LiDAR controller 600 may include a preprocessing unit 610, a clustering unit 620, a shape analysis unit 630, and an object-tracking unit (a tracking unit, a tracking and classification unit, or an object-detecting unit) 640.

After step 110, the points generated by the LiDAR sensor 500 may be preprocessed (step 120).

After step 120, clustering is performed on the preprocessed points (step 130). To this end, the clustering unit 620 clusters the points preprocessed by the preprocessing unit 610 and outputs the result of clustering to the shape analysis unit 630. The term "clustering" refers to the process of classifying the preprocessed points into groups such that each group includes points associated with the same object. The clustering unit 620 may group the points by applying a grid-based clustering method or a density-based clustering method thereto to generate a contour of the object. The result of sensing by the LiDAR sensor 500 shows a plurality of points, each of which has only information about a location (or coordinates). Therefore, the clustering unit 620 serves to group the preprocessed points for each object and to generate clusters, which are the result of the grouping.

After step 130, the result of the clustering is converted into a plurality of geometric box shapes for each channel in order to analyze the shape of the object (step 140). To this end, the shape analysis unit 630 may convert the clusters, which are the result of clustering by the clustering unit 620, into a plurality of geometric box shapes for each channel, and may output at least one of the width, length, position, or orientation (or heading) of the box to the object-tracking unit 640 as information about the box.

After step 140, whether the object, the shape of which has been analyzed, is an obstacle, a vehicle, or a person may be tracked in order to recognize the object (step 150). To this end, the object-tracking unit 640 may track the type of object, the shape of which has been analyzed, and may recognize the same.

Hereinafter, an embodiment of step 120 using the LiDAR sensor shown in FIG. 1 will be described with reference to the accompanying drawings.

Figure 3:
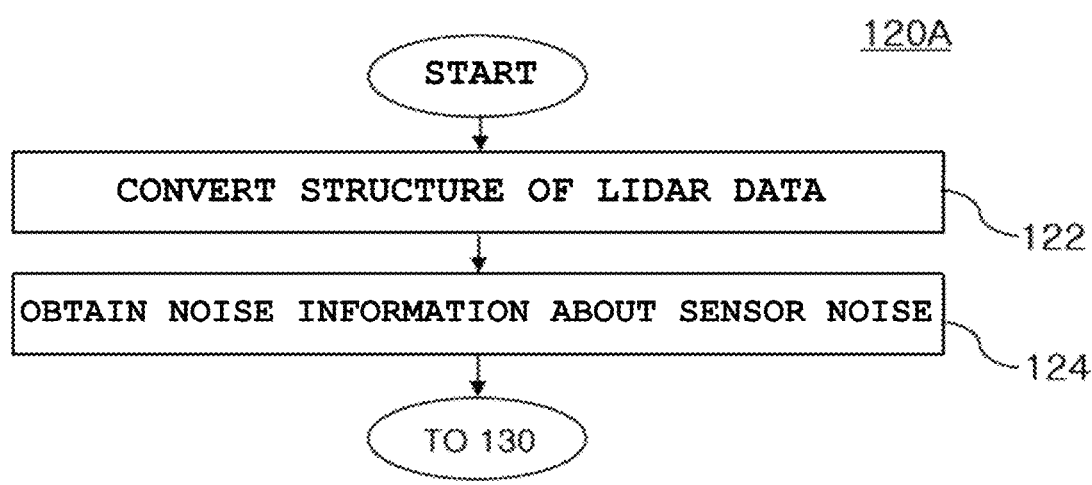
FIG. 3 is a flowchart showing an embodiment of step 120 shown in FIG. 1.
Figure 4:
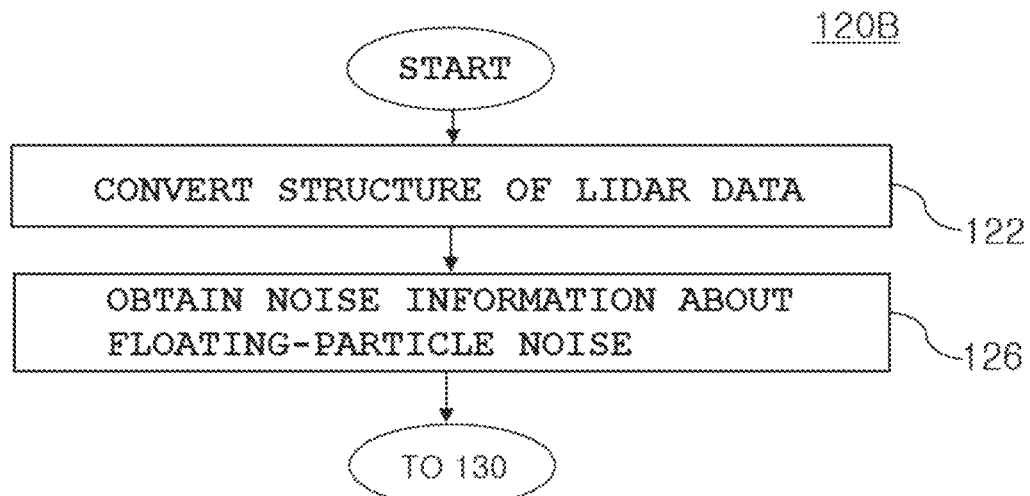
FIG. 4 is a flowchart showing another embodiment of step 120 shown in FIG. 1.
Figure 5:
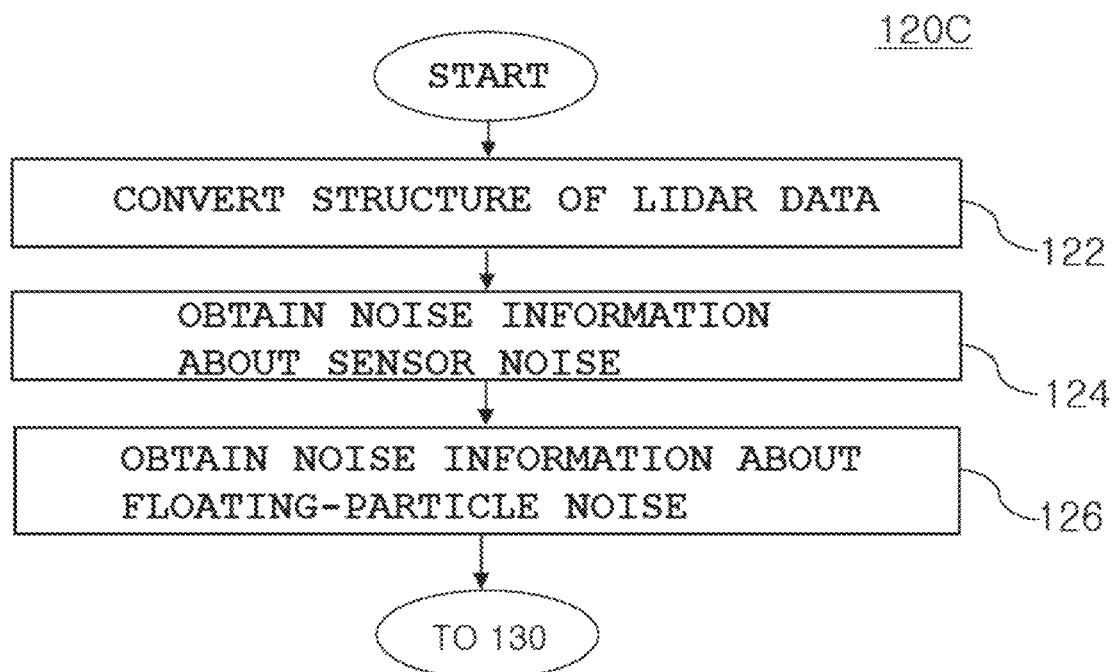
FIG. 5 is a flowchart showing still another embodiment of step 120 shown in FIG. 1.

FIG. 3 is a flowchart showing an embodiment 120A of step 120 shown in FIG. 1, FIG. 4 is a flowchart showing another embodiment 120B of step 120 shown in FIG. 1, and FIG. 5 is a flowchart showing still another embodiment 120C of step 120 shown in FIG. 1.

According to an embodiment, the structure of the LiDAR data, which is composed of the points acquired by the LiDAR sensor 500, is converted first (step 122). For example, the LiDAR data acquired by the LiDAR sensor 500 may be received in the form of an Ethernet packet, and parsing may be performed in step 122 in order to convert the LiDAR data into an easy-to-process point structure.

The Ethernet packet provides information on a distance value, a layer number, and an angle value based on the point level. In addition, data is set in an array according to the channel to which the data belongs and the timing at which the data was input, and the array of data is sequentially applied to the point structure generated by the LiDAR sensor. This structure may include index information indicating the order of entry of a channel into one frame. Here, the index information may be related to a scan pattern, and may include, for example, an index for confirming instantaneous data at the time of radiation of a laser pulse and an index of a laser emitted from the left, right, top and bottom of the laser index.

For example, the structure has information on the coordinates or characteristics of each of the points acquired by the LiDAR sensor 500 (e.g. the intensity or angle value of each point). That is, the structure has all of the information about the point to be processed. Therefore, the conversion of the LiDAR data into an easy-to-process point structure may be conversion from the form of an Ethernet packet into the form of a structure.

When step 122 is performed, the validity of each of the points acquired by the LiDAR sensor 500 (hereinafter referred to as "first points") may be determined. Here, the validity means whether the first points are valid points or invalid points.

In some cases, although the LiDAR sensor 500 emits a laser pulse, a point may not be input to the preprocessing unit 610. Therefore, a flag may be set so as to indicate that a point belonging to this layer is an invalid point.

In addition, a flag may be set so as to indicate that a point that is input to the preprocessing unit 610 through emission of a laser pulse and satisfies a predetermined condition, among the first points, is a valid point. For example, a point satisfying the predetermined condition may be a point located in a certain field of view (FOV), among the first points.

After step 122, noise information indicating whether the target point is a noise point may be determined based on the spacing distance between the target point and a neighboring point among the first points (step 124 or 126). Here, the target point is a point to be subjected to noise inspection, among the first points, which will be described in detail later.

The neighboring point is a point adjacent to the target point in the same layer as the target point. For example, the neighboring point may be a point acquired at a time point t−1 prior to a time point t, at which the target point is acquired, or a time point t+1, following the time point t, and adjacent to the target point in the same layer as the target point. That is, the neighboring point may correspond to a point having one index difference from the target point.

Also, the noise point is a point generated due to noise, rather than a point sensed with respect to an object. Examples of noise points may include a point (hereinafter referred to as a "first noise point") generated due to noise such as floating particles in the air around the host vehicle, for example, rain, snow, fog, fallen leaves, or dust particles (hereinafter referred to as "first noise" or "floating-particle noise"), and a point (hereinafter referred to as a "second noise point") generated due to noise generated from the LiDAR sensor 500 itself (hereinafter referred to as "second noise" or "sensor noise"). Alternatively, the second noise may be noise generated from an object having very high reflectivity.

In the case of the embodiment 120A shown in FIG. 3, noise information indicating whether the target point is a second noise point generated due to sensor noise (hereinafter referred to as "second noise information") is determined (step 124). In the case of another embodiment 120B shown in FIG. 4, noise information indicating whether the target point is a first noise point generated due to floating-particle noise (hereinafter referred to as "first noise information") is determined (step 126). In the case of still another embodiment 120C shown in FIG. 5, both the second noise information and the first noise information are determined (steps 124 and 126).

Both steps 124 and 126 shown in FIGS. 3 to 5 may be performed by the preprocessing unit 610 shown in FIG. 2, but the embodiments are not limited thereto.

For example, each of the first noise information determined in step 126 and the second noise information determined in step 124 may be expressed in the form of a flag.

In this way, when at least one of the first or second noise information is determined in the form of a flag, the clustering unit 620 clusters the first points using the determined flag-type noise information (step 130). For example, the clustering unit 620 may recognize points generated due to noise using the flag-type noise information, and may perform clustering on the first points, other than these points.

Although it is illustrated in FIG. 5 that step 126 is performed after step 124, the embodiments are not limited thereto. That is, according to another embodiment, step 124 may be performed after step 126, or step 124 and step 126 may be performed simultaneously.

In addition, as shown in FIG. 5, when step 126 is performed after step 124, the first noise information may be obtained by performing step 126 on a point other than the point determined to be the second noise point in step 124, among the first points. In this case, the time taken to determine the first noise information, that is, to perform step 126, may be shorter than when step 126 is performed on all of the first points.

Alternatively, unlike what is illustrated in FIG. 5, when step 124 is performed after step 126, the second noise information may be obtained by performing step 124 on a point other than the point determined to be the first noise point in step 126, among the first points. In this case, the time taken to determine the second noise information, that is, to perform step 124, may be shorter than when step 124 is performed on all of the first points.

Hereinafter, a method of determining at least one of the first or second noise information shown in FIGS. 3 to 5 will be described with reference to the accompanying drawings. A method of determining the second noise information will be described before the description of the method of determining the first noise information.

Figure 6:
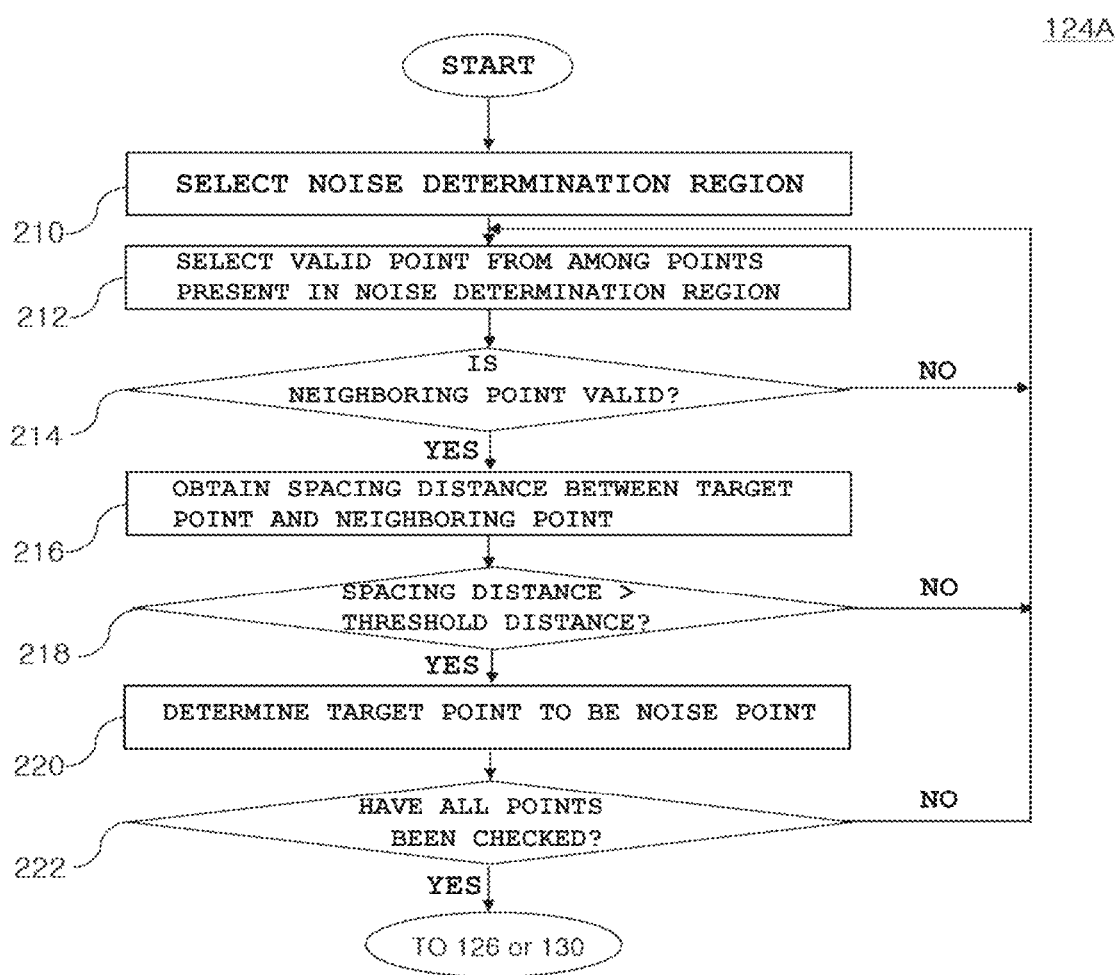
FIG. 6 is a flowchart showing an embodiment of step 124 shown in each of FIGS. 3 and 5.

FIG. 6 is a flowchart showing an embodiment 124A of step 124 shown in each of FIGS. 3 and 5.

According to the embodiment, the second noise information is determined as follows (steps 210 to 222).

First, a noise determination region, in which whether the first points are the second noise points is to be determined (hereinafter referred to as a "second noise determination region"), is selected (step 210). Here, the second noise is generated differently depending on the type of the LiDAR sensor 500. Accordingly, the second noise determination region may be selected according to the type of the LiDAR sensor 500.

After step 210, valid points (hereinafter referred to as "3-$2^{nd}$ points") are selected from among the points that are present in the second noise determination region (hereinafter referred to as "2-$2^{nd}$ points"), among the first points (step 212). Here, each of the 3-$2^{nd}$ points refers to the aforementioned target point (hereinafter referred to as a "second target point").

Whether the 2-$2^{nd}$ points are valid points or invalid points may be determined with reference to the flag indicating the validity determined in step 122. For example, since the validity of each of the first points is checked and the determination of whether the checked first points are valid points or invalid points is incorporated into the flag in step 122, the validity of the 2-$2^{nd}$ points may be checked by referring to the flag.

After step 212, when a neighboring point (hereinafter referred to as a "second neighboring point") adjacent to the 3-$2^{nd}$ point, which is determined to be a valid point, that is, the second target point, is determined to be a valid point, the second noise information is determined based on the spacing distance between the second target point and the second neighboring point (steps 214 to 220).

After step 212, whether the second neighboring point is valid, that is, a valid point, is checked (step 214).

If the second neighboring point is a valid point, the spacing distance between the second target point and the second neighboring point (hereinafter referred to as a "second spacing distance") is obtained (step 216). However, if the second neighboring point is not a valid point, the process goes to step 212 to select another second target point from among the 2-$2^{nd}$ points, and step 214 is performed on a second neighboring point that is adjacent to the selected another second target point in the same layer as the selected another second target point.

After step 216, whether the second spacing distance is greater than a threshold distance (hereinafter referred to as a "second threshold distance") is checked (step 218).

If the second spacing distance is greater than the second threshold distance, second noise information indicating that the second target point is the second noise point is determined (step 220). However, if the second spacing distance is not greater than the second threshold distance, the process goes to step 212, and steps 212 to 218 are performed on another 2-$2^{nd}$ point.

Steps 212 to 220 are performed on each of the 2-$2^{nd}$ points. Accordingly, after step 220, whether steps 212 to 220 have been performed on all of the 2-$2^{nd}$ points is checked (step 222). If steps 212 to 220 have not been performed on all of the 2-$2^{nd}$ points, the process goes to step 212, and steps 212 to 220 are repeatedly performed on the 2-$2^{nd}$ points that have not undergone steps 212 to 220. However, when steps 212 to 220 have been performed on all of the 2-$2^{nd}$ points, the process goes to step 130 in the case of FIG. 3, and the process goes to step 126 in the case of FIG. 5. Also, although not illustrated in FIG. 6, even if there is no point satisfying both step 214 and step 218, among the 2-$2^{nd}$ points, the process goes to step 130 in the case of FIG. 3, and the process goes to step 126 in the case of FIG. 5.

Figure 7:
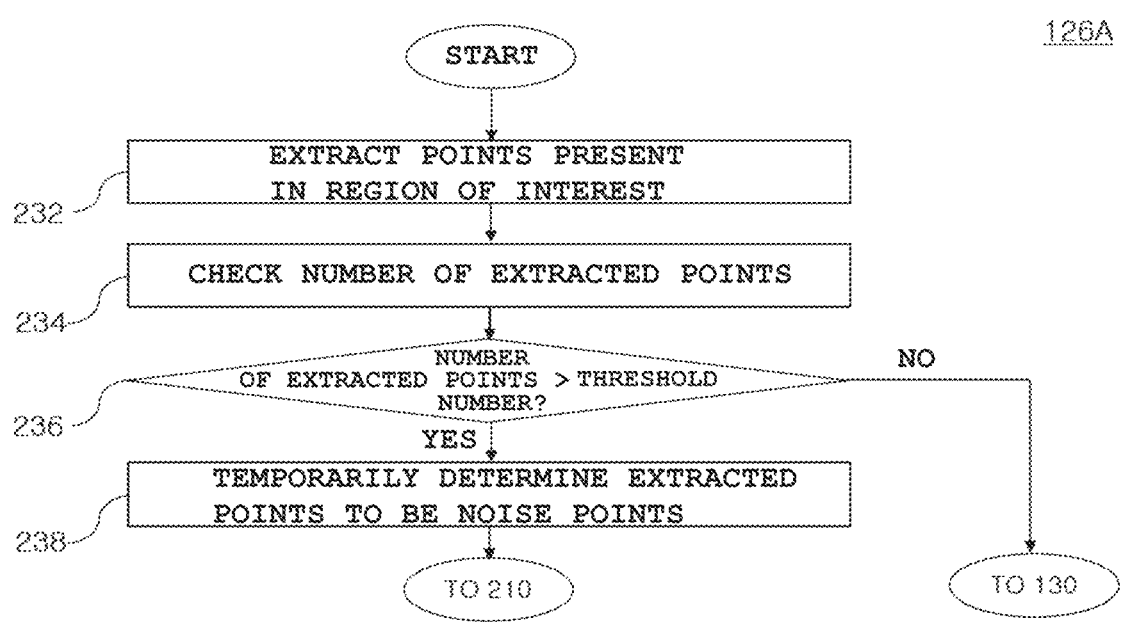
FIG. 7 is a flowchart showing an embodiment of step 126 shown in each of FIGS. 4 and 5.

FIG. 7 is a flowchart showing an embodiment 126A of step 126 shown in each of FIGS. 4 and 5.

Figure 8:
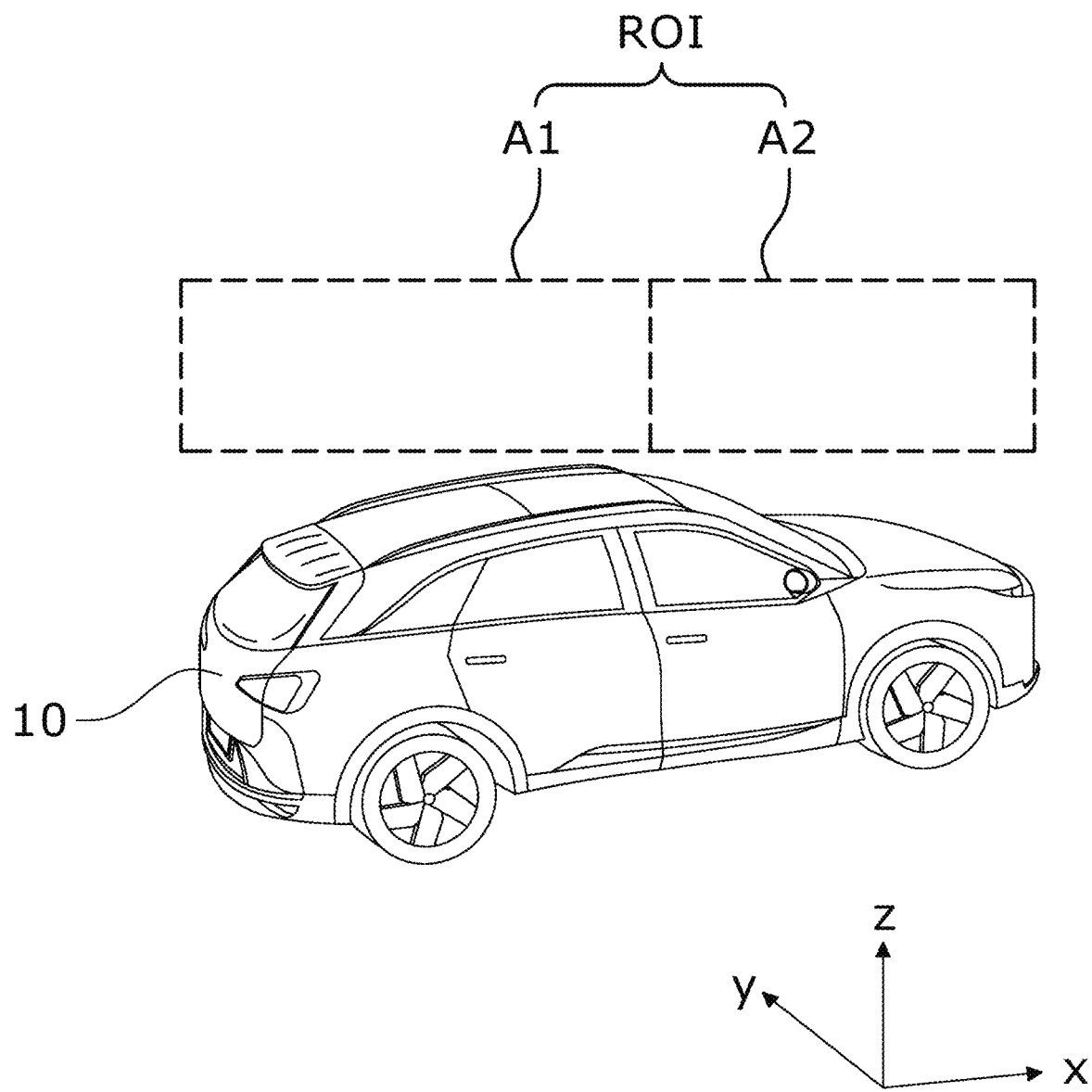
FIG. 8 is a perspective view showing the external appearance of a host vehicle equipped with a LiDAR sensor.

FIG. 8 is a perspective view showing the external appearance of a host vehicle 10 equipped with the LiDAR sensor 500.

Figure 9:
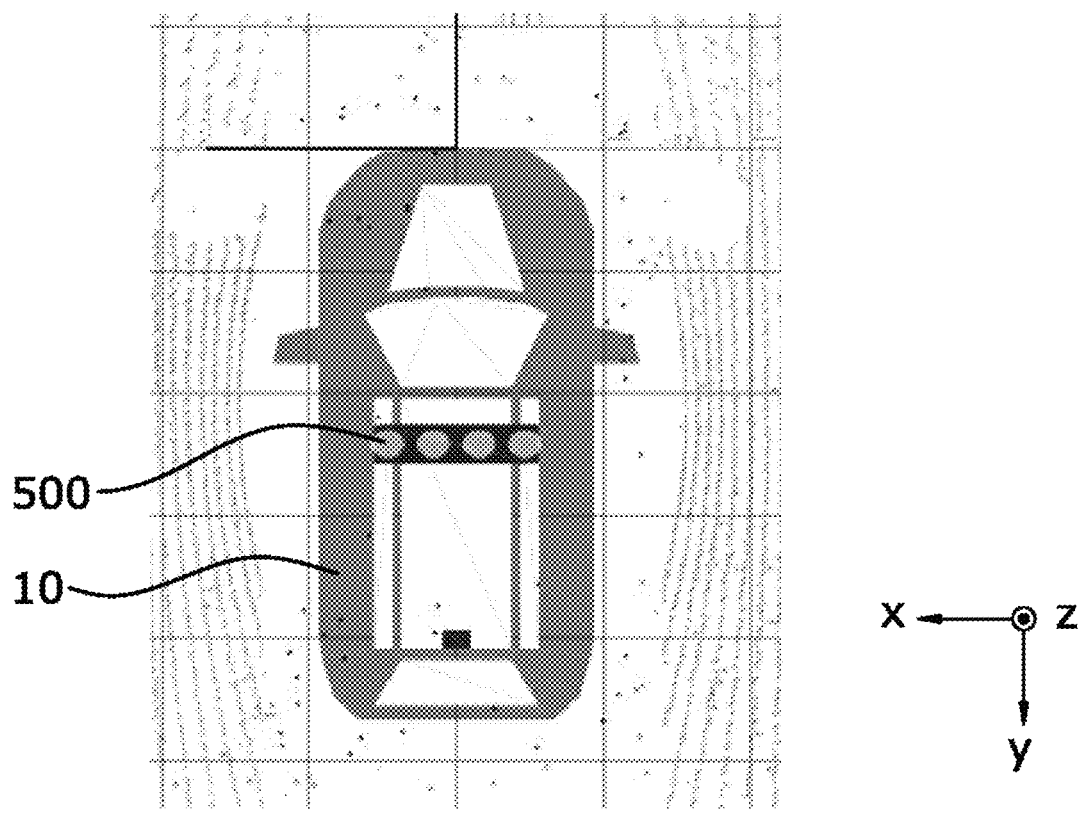
FIG. 9 is a plan view of the host vehicle equipped with the LiDAR sensor.
Figure 10:
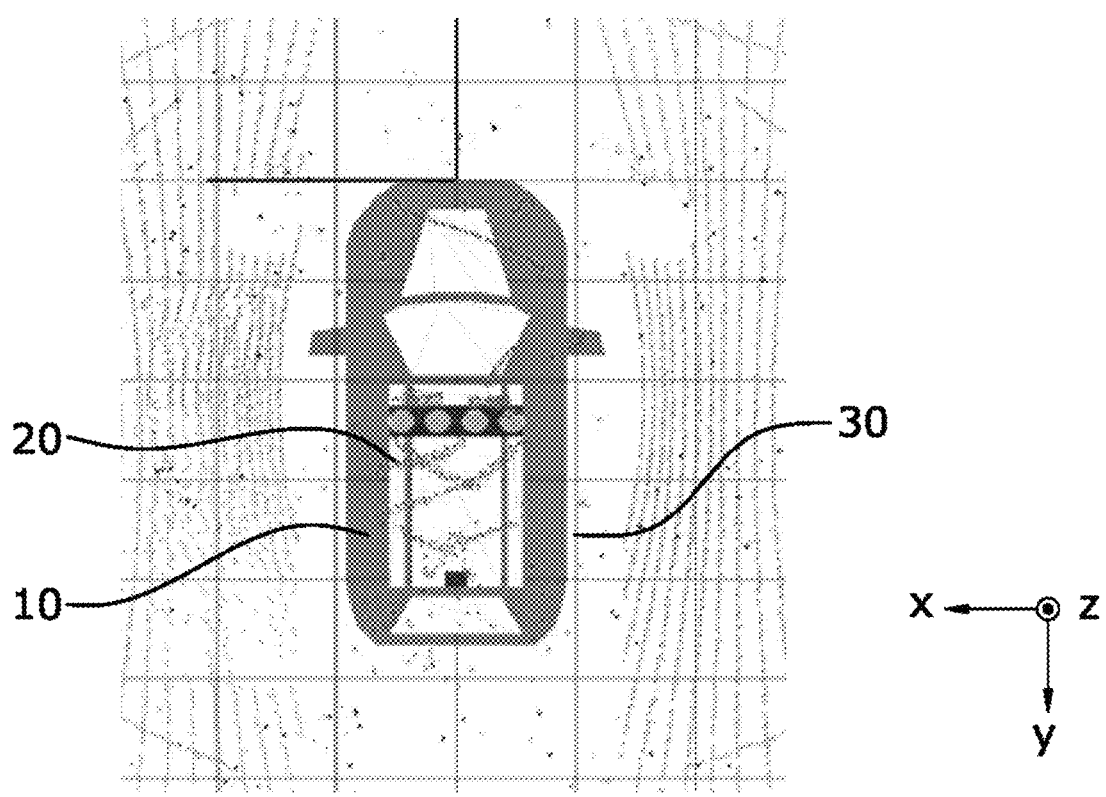
FIG. 10 is a view exemplarily showing points acquired from the surroundings of the host vehicle shown in FIG. 9.

FIG. 9 is a plan view of the host vehicle 10 equipped with the LiDAR sensor 500, and FIG. 10 is a view exemplarily showing points acquired from the surroundings of the host vehicle 10 shown in FIG. 9.

According to the embodiment, the first noise information is determined as follows (steps 232 to 238 and steps 210 to 222).

A point present in a region of interest (ROI) is extracted from among the first points (step 232). Here, the ROI may be a region above the host vehicle 10, excluding the host vehicle 10. For example, referring to FIG. 8, the ROI may include a top region A1, which is located above the roof of the host vehicle 10, and a peripheral region A2, which is located in the vicinity of the top region A1 (e.g. a region in which the point 30 shown in FIG. 10 is disposed).

In addition, according to the embodiment, the ROI may be selected, and a region in which data pertaining to reflections from the body of the host vehicle 10 (e.g. 20 shown in FIG. 10) is present (hereinafter referred to as a "reflection region") may be excluded from the selected ROI. Since there is a region that is shielded by the body of the host vehicle 10 depending on the mounting position and the field of view of the LiDAR sensor 500, data pertaining to reflections from the body of the host vehicle 10 may be removed using a reference coordinate system. The reason for removing data pertaining to reflections from the body of the host vehicle 10 is that a noise point generated due to the first noise or the second noise is generated regardless of data pertaining to reflections from the vehicle body. That is, in the case of removing data pertaining to reflections, the time taken to perform steps 234 to 238 and steps 210 to 222 for obtaining the first noise information may be shortened.

In addition, a flag may be selected with respect to a point present in the region obtained by removing the reflection region from the ROI.

After step 232, the number of extracted points present in the ROI is checked (step 234).

After step 234, whether the number of extracted points is greater than a threshold number is checked (step 236).

If the number of extracted points is not greater than the threshold number, the extracted points are determined not to be the first noise points, and thus the process goes to step 130. On the other hand, if the number of extracted points is greater than the threshold number, it is temporarily determined that the extracted points are points generated due to the first noise (hereinafter referred to as "fourth points") (step 238). After step 238, steps 210 to 222 shown in FIG. 6 are performed.

Referring to FIG. 6, a noise determination region in which whether the first points are points generated due to the first noise is to be determined (hereinafter referred to as a "first noise determination region") is selected (step 210).

The size of the first noise determination region may be determined depending on the number of fourth points. For example, the size of the first noise determination region may be determined in proportion to the number of fourth points. That is, when the number of fourth points is large, the size of the first noise determination region may be determined to be larger than when the number of fourth points is small.

After step 210, valid points (hereinafter referred to as "3-$1^{st}$ points") are selected from among points present in the first noise determination region (hereinafter referred to as "2-$1^{st}$ points"), among the first points (step 212). Here, each of the 3-$1^{st}$ points refers to the aforementioned target point (hereinafter referred to as a "first target point").

Whether or not the 2-$1^{st}$ points are valid points may be determined with reference to the validity determined in step 122. For example, since the validity of each of the first points is checked and the determination of whether the checked points are valid points or invalid points is incorporated into the flag in step 122, the validity of the 2-$1^{st}$ points, that is, whether the 2-$1^{st}$ points are valid points or invalid points, may be checked by referring to the flag.

After step 212, when a neighboring point (hereinafter referred to as a "first neighboring point") adjacent to the 3-$1^{st}$ point, which is determined to be a valid point, that is, the first target point, is determined to be a valid point, the first noise information is determined based on the spacing distance between the first target point and the first neighboring point (steps 214 to 220).

After step 212, whether the first neighboring point is valid, that is, a valid point, is checked (step 214).

If the first neighboring point is a valid point, the spacing distance between the first target point and the first neighboring point (hereinafter referred to as a "first spacing distance") is obtained (step 216). However, if the first neighboring point is not a valid point, the process goes to step 212 to select another first target point from among the 2-$1^{st}$ points, and steps 214 and 216 are performed on a first neighboring point that is adjacent to the selected another first target point in the same layer as the selected another first target point.

After step 216, whether the first spacing distance is greater than a threshold distance (hereinafter referred to as a "first threshold distance") is checked (step 218).

If the first spacing distance is greater than the first threshold distance, first noise information indicating that the first target point is the first noise point is determined (step 220). However, if the first spacing distance is not greater than the first threshold distance, the process goes to step 212, and steps 212 to 218 are performed on another 2-$1^{st}$ point.

Steps 212 to 220 are performed on each of the 2-$1^{st}$ points. Accordingly, after step 220, whether steps 212 to 220 have been performed on all of the 2-$1^{st}$ points is checked (step 222). If steps 212 to 220 have not been performed on all of the 2-$1^{st}$ points, the process goes to step 212, and steps 212 to 220 are repeatedly performed on the remaining 2-$1^{st}$ points. However, when steps 212 to 220 have been performed on all of the 2-$1^{st}$ points, the process goes to step 130. Also, although not illustrated in FIG. 6, even if there is no point satisfying both step 214 and step 218, among the 2-$1^{st}$ points, the process goes to step 130.

Meanwhile, a recording medium in which a program for executing the method 100 of tracking an object using a LiDAR sensor is recorded may store a program for implementing a function of determining, based on the spacing distance between a target point and a valid neighboring point adjacent to the target point in the same layer as the target point, among first points acquired by the LiDAR sensor, noise information indicating whether the target point is a noise point and a function of clustering the first points using the noise information. The recording medium may be read by a computer system.

In addition, a recording medium in which a program for executing the method 100 of tracking an object using a LiDAR sensor is recorded may store a program for implementing a function of determining, based on a first spacing distance between a first target point and a valid first neighboring point adjacent to the first target point in the same layer as the first target point, among first points acquired by the LiDAR sensor, first noise information indicating whether the first target point is a first noise point generated due to floating particles in the air, a function of determining, based on a second spacing distance between a second target point and a valid second neighboring point adjacent to the second target point in the same layer as the second target point, among the first points, second noise information indicating whether the second target point is a second noise point generated due to the LiDAR sensor, and a function of clustering the first points using the first noise information and the second noise information. The recording medium may be read by a computer system.

The computer-readable recording medium includes all kinds of recording devices in which data capable of being read by a computer system are stored. Examples of the computer-readable recording medium include Read-Only Memory (ROM), Random Access Memory (RAM), Compact Disk ROM (CD-ROM), magnetic tape, floppy discs, and optical data storage. The computer-readable recording medium can also be distributed over network-connected computer systems so that the computer-readable code is stored and executed in a distributed fashion. Also, functional programs, code, and code segments for accomplishing the method 100 of tracking an object using a LiDAR sensor can be easily devised by programmers skilled in the art to which the present disclosure pertains.

Hereinafter, an embodiment of the object-tracking apparatus according to the embodiment will be described with reference to the accompanying drawings.

Figure 11:
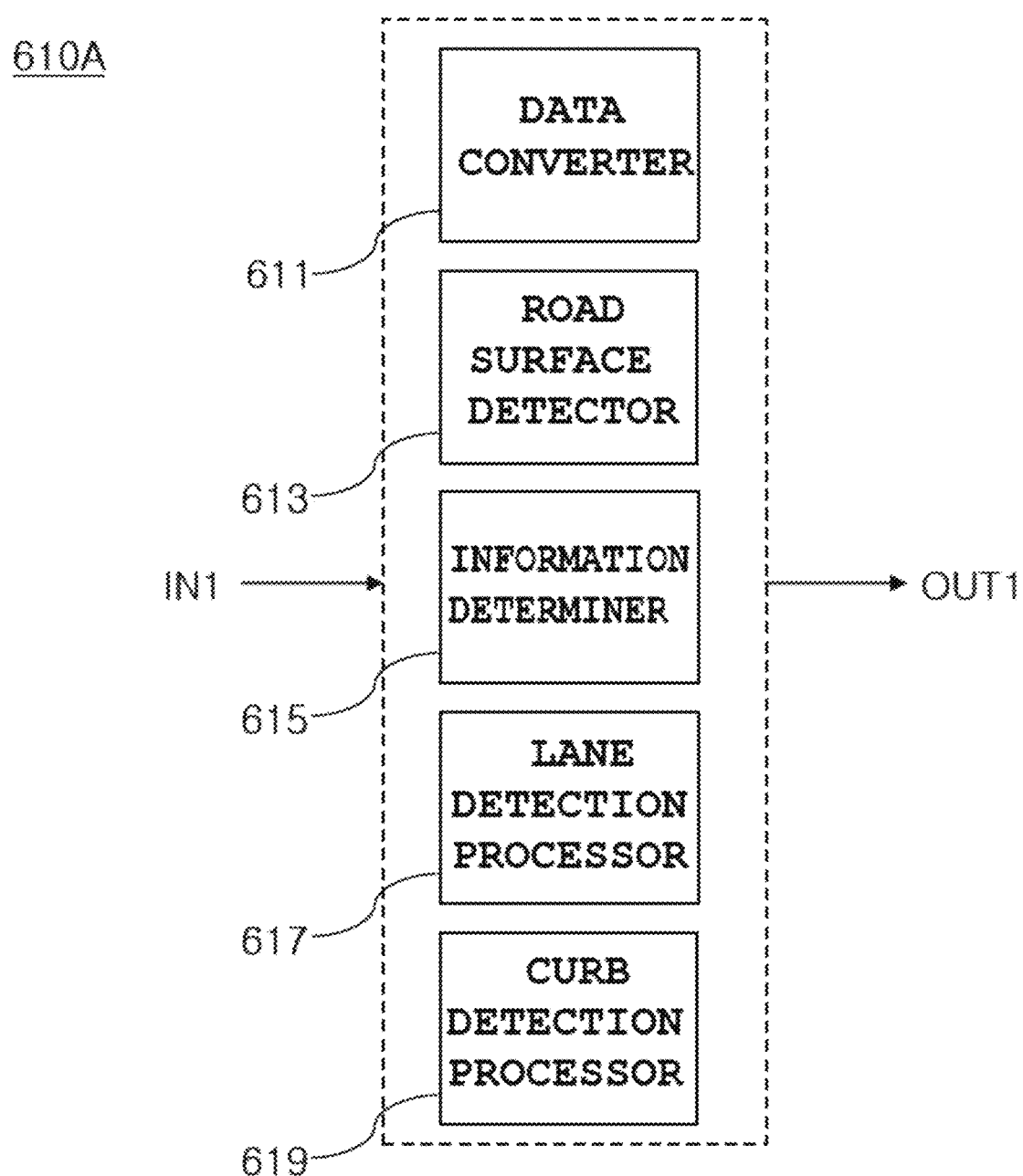
FIG. 11 is a block diagram of an embodiment of the preprocessing unit shown in FIG. 2.

FIG. 11 is a block diagram of an embodiment 610A of the preprocessing unit 610 shown in FIG. 2.

The preprocessing unit 610A shown in FIG. 11 may include a data converter 611 and an information determiner 615. In addition, the preprocessing unit 610A shown in FIG. 11 may further include at least one of a road surface detector 613, a lane detection processor 617, or a curb detection processor 619.

The data converter 611, the road surface detector 613, the information determiner 615, the lane detection processor 617, and the curb detection processor 619 shown in FIG. 11 may perform the functions inherent thereto in any order.

The data converter 611 receives LiDAR data, which are points acquired by the LiDAR sensor 500, through an input terminal IN1, and converts the structure of the LiDAR data. In this way, the data converter 611 performs step 122 shown in FIGS. 3 to 5.

The road surface detector 613 serves to remove a point corresponding to the road surface, among the points acquired by the LiDAR sensor 500, from the target object to be detected.

The lane detection processor 617 and the curb detection processor 619 serve to detect a lane or a curb and to process the result of the detection based on data on the road surface detected by the road surface detector 613.

The preprocessing unit 610A according to the embodiment is not limited to the presence or absence of each of the road surface detector 613, the lane detection processor 617, and the curb detection processor 619, or to any specific operation method of each of these components 613, 617 and 619.

The information determiner 615 may determine, based on the spacing distance between a target point and a valid neighboring point adjacent to the target point in the same layer as the target point, among the first points acquired by the LiDAR sensor, noise information indicating whether the target point is a noise point, and may output the determined noise information to the clustering unit 620 through an output terminal OUT1. In this case, the clustering unit 620 may cluster the first points using the noise information output from the information determiner 615.

The information determiner 615 may perform at least one of step 124 or step 126 shown in FIGS. 3 to 5.

Figure 12:
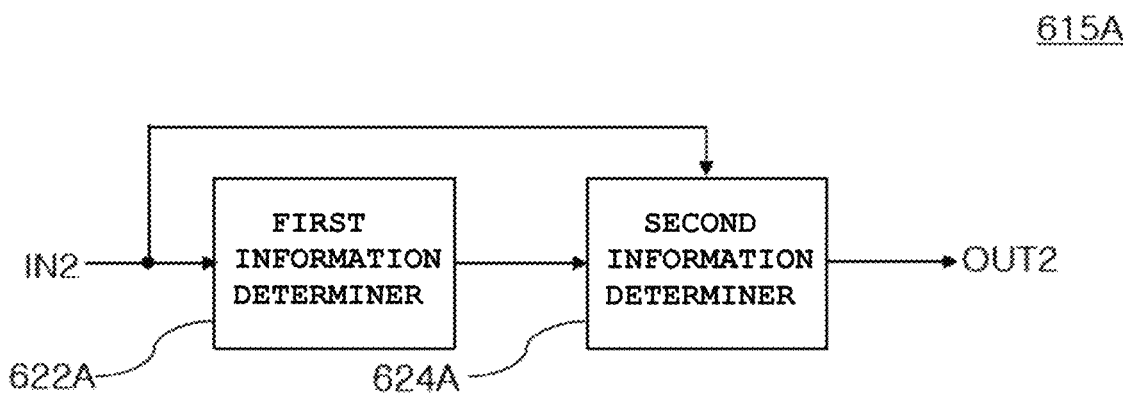
FIG. 12 is a block diagram showing an embodiment of the information determiner shown in FIG. 11.

FIG. 12 is a block diagram showing an embodiment 615A of the information determiner 615 shown in FIG. 11.

The information determiner 615A may include first and second information determiners 622A and 624A.

The first information determiner 622A determines first noise information about the first points received from the data converter 611 through an input terminal IN2, and outputs the determined first noise information to the second information determiner 624A. In this way, the first information determiner 622A may perform step 124 shown in FIG. 5.

The second information determiner 624A determines second noise information about each of points other than the first noise point, among the first points input through the input terminal IN2, based on the first noise information determined by the first information determiner 622A, and outputs the determined second noise information to the clustering unit 620 through an output terminal OUT2. In this way, the second information determiner 624A serves to perform step 126 shown in FIG. 5. In this case, the clustering unit 620 may perform clustering on the first points using the second noise information. That is, the clustering unit 620 may recognize the second noise point generated due to the second noise using the flag-type noise information, and may perform clustering in the manner of removing the second noise point from the first points.

One of the first and second information determiners 622A and 624A shown in FIG. 12 may be omitted.

If the information determiner 615 shown in FIG. 11 includes only the second information determiner 624A shown in FIG. 12, the second information determiner 624A may determine second noise information about each of the first points received from the data converter 611 through the input terminal IN2, and may output the determined second noise information to the clustering unit 620 through the output terminal OUT2. In this way, the second information determiner 624A may perform step 124 shown in FIG. 3.

Alternatively, if the information determiner 615 shown in FIG. 11 includes only the first information determiner 622A shown in FIG. 12, the first information determiner 622A may determine first noise information about each of the first points received from the data converter 611 through the input terminal IN2, and may output the determined first noise information to the clustering unit 620 through the output terminal OUT2. In this way, the first information determiner 622A may perform step 126 shown in FIG. 4.

Figure 13:
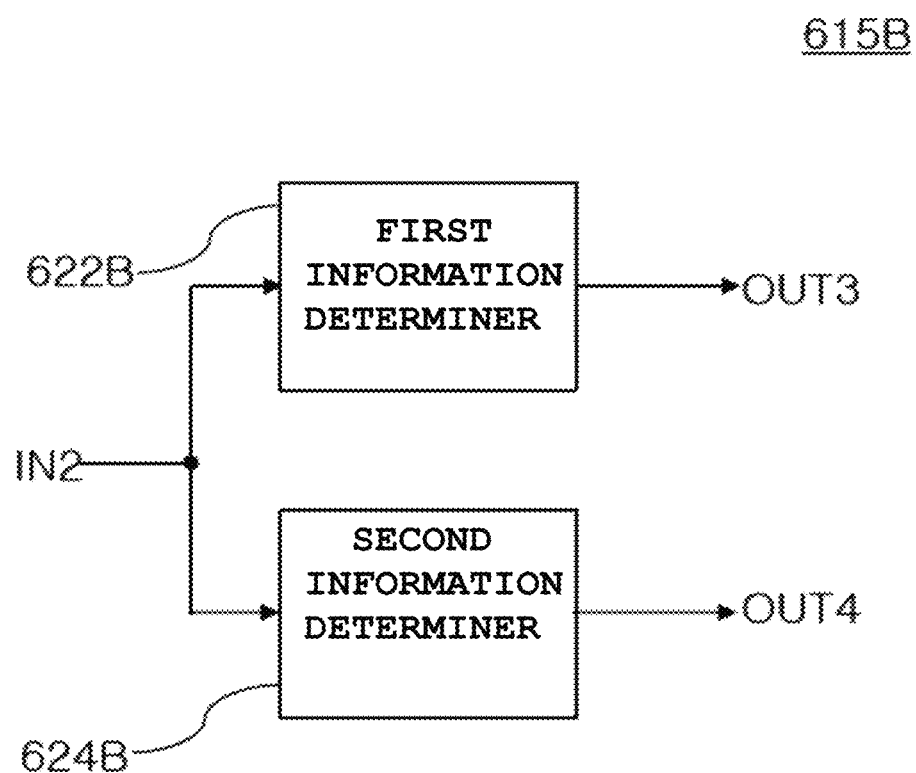
FIG. 13 is a block diagram showing another embodiment of the information determiner shown in FIG. 11.

FIG. 13 is a block diagram showing another embodiment 615B of the information determiner 615 shown in FIG. 11.

The information determiner 615B may include first and second information determiners 622B and 624B.

The first information determiner 622B may determine, based on a first spacing distance between a first target point and a valid first neighboring point adjacent to the first target point in the same layer as the first target point, among the first points received from the data converter 611 through the input terminal IN2, first noise information indicating whether the first target point is a first noise point, and may output the determined first noise information to the clustering unit 620 through an output terminal OUT3. In this way, the first information determiner 622B performs step 126 shown in FIGS. 4 and 5.

At this time, the clustering unit 620 may recognize the first noise point generated due to the first noise using the flag-type noise information, and may perform clustering in the manner of removing the first noise point from the first points.

The second information determiner 624B may determine, based on a second spacing distance between a second target point and a valid second neighboring point adjacent to the second target point in the same layer as the second target point, among the first points received from the data converter 611 through the input terminal IN2, second noise information indicating whether the second target point is a second noise point, and may output the determined second noise information to the clustering unit 620 through an output terminal OUT4. In this way, the second information determiner 624B performs step 124 shown in FIGS. 3 and 5.

In this case, the clustering unit 620 may perform clustering on the first points using the first and second noise information. For example, the clustering unit 620 may recognize the first and second noise points, respectively generated due to the first and second noises, among the first points using the first and second flag-type noise information, and may perform clustering in the manner of removing the first and second noise points from the first points.

Hereinafter, an object-tracking method according to a comparative example and the object-tracking method according to the embodiment will be described with reference to the accompanying drawings.

Figure 14:
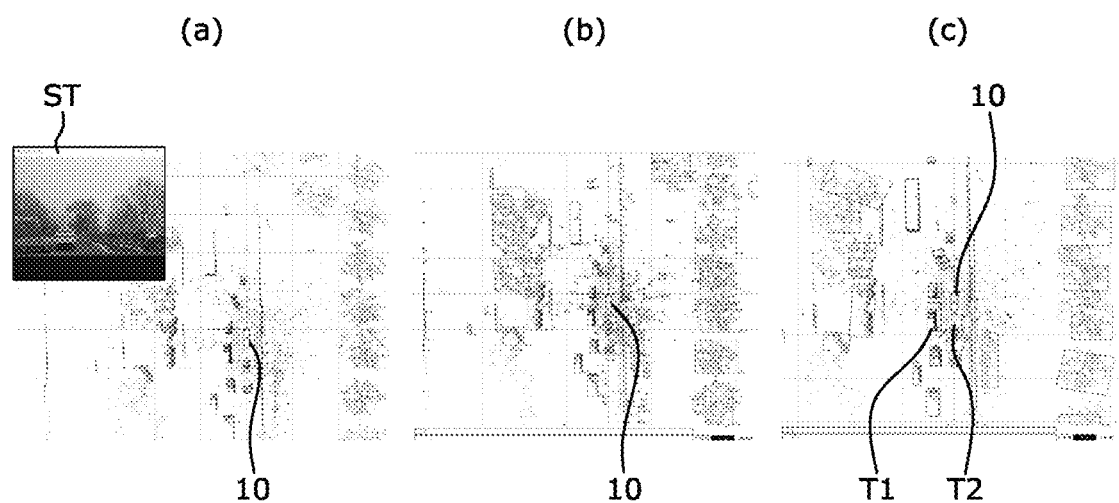
FIG. 14 is a diagram showing an object-tracking method of a first comparative example, which processes points including points generated due to first noise.

FIG. 14 is a diagram showing an object-tracking method of a first comparative example, which processes points including points generated due to first noise.

As shown in FIG. 14 (*a*), in the situation ST in which the host vehicle 10 is traveling in snowy weather, according to the first comparative example, the LiDAR sensor may generate points due to snow (e.g., the points shown in FIG. 14 (*a*)). That is, the LiDAR sensor may generate first points due to snow.

When these first points are clustered, as shown in FIG. 14 (*b*), the points associated with the snow may be generated as a cluster, and a track may be generated using this cluster, as shown in FIG. 14 (*c*). Accordingly, incorrect tracks T1 and T2 may be generated, for example, on the left side of the host vehicle 10 and below the host vehicle 10 due to the cluster generated due to the snow.

As described above, in the case of the first comparative example, when it snows, the LiDAR sensor 500 may recognize points associated with the snow, and may incorrectly recognize an object due to the points generated due to the snow rather than the object, thus leading to deterioration in object detection performance.

In contrast, according to the embodiment, it is determined in the preprocessing step that points generated due to floating particles in the air, such as snow or rain, are noise points, and clustering is performed based on the result of the determination. Therefore, according to the embodiment, it is possible to prevent deterioration in object detection performance due to snow and thus to accurately detect an object at a level similar to when detecting an object in clear weather.

Figure 15:
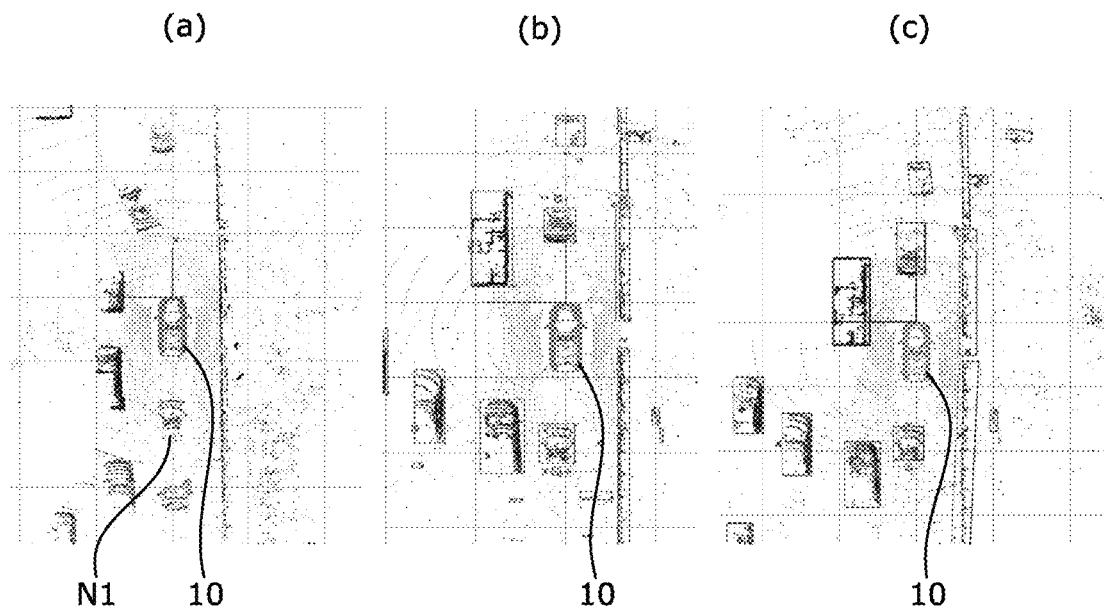
FIG. 15 is a diagram showing the object-tracking method according to the embodiment, which processes first noise points.

FIG. 15 is a diagram showing the object-tracking method according to the embodiment, which processes the first noise points.

While the host vehicle 10 is traveling in snowy weather, when the LiDAR sensor 500 emits a laser pulse, points associated with snow (e.g. points N1 shown in FIG. 15 (*a*)) may be generated.

At this time, according to the embodiment, as described above, the first noise points generated due to the snow are determined, and first noise information related thereto is output to the clustering unit 620. Then, the clustering unit 620 recognizes the first noise points among the first points using the first noise information, and performs clustering on the points other than the first noise points. Accordingly, as shown in FIG. 15 (*b*), a cluster that is not affected by the first noise may be generated by the clustering unit 620. In the case of generating the cluster in this way, as shown in FIG. 15 (*c*), objects are output in the state of being individually separated rather than being combined.

Figure 16:
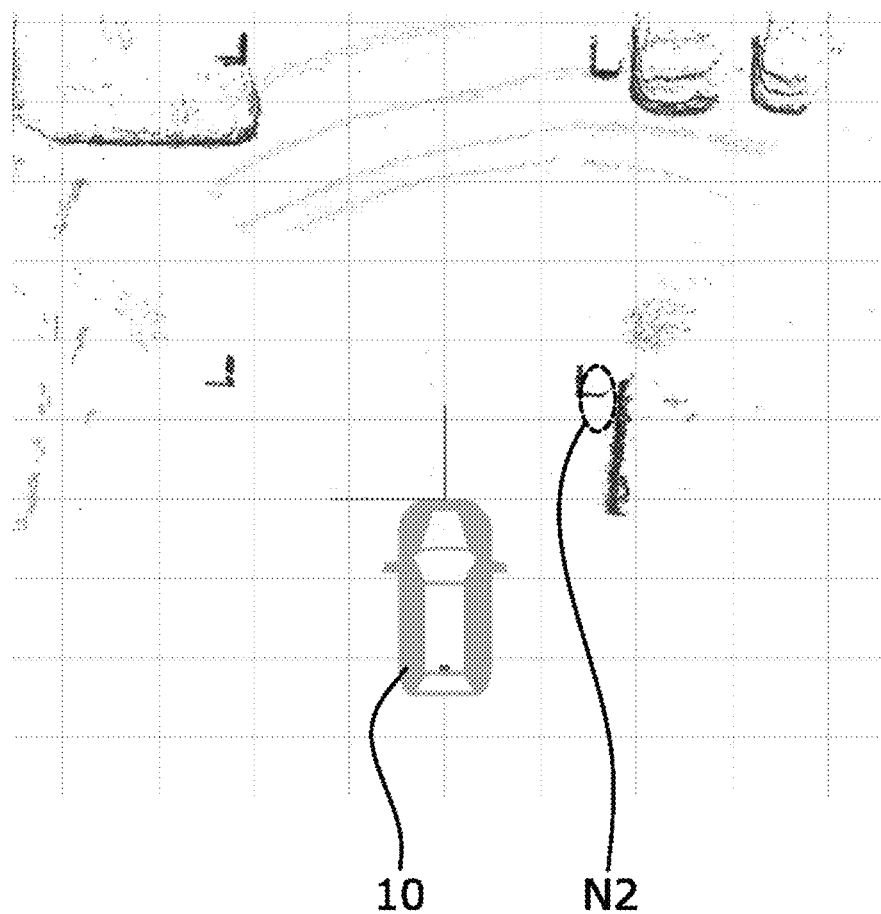
FIG. 16 is a diagram showing an object-tracking method of a second comparative example, which processes points generated due to second noise.

FIG. 16 is a diagram showing an object-tracking method of a second comparative example, which processes points generated due to the second noise.

In the case of the second comparative example, when using second noise points generated due to the second noise, which is generated inside the LiDAR sensor 500 or from an object having very high reflectivity, an error (e.g. N2) due to the second noise may occur in the vicinity of the host vehicle 10, as shown in FIG. 16.

In contrast, according to the embodiment, since clustering is not performed on the second noise points generated due to the second noise, the occurrence of the error N2 shown in FIG. 16 may be minimized or prevented.

As a result, according to the method and apparatus for tracking an object using a LiDAR sensor and the recording medium storing a program to execute the method of the embodiments described above, points generated due to floating particles in the air are determined to be noise points and are not used for clustering, thereby making it possible to minimize deterioration in object recognition performance.

In addition, in order to determine whether the first points are first noise points, fourth points belonging to the region of interest (ROI) are extracted from among the first points, and whether the extracted fourth points are first noise points is determined without the necessity to check all of the first points. Accordingly, the number of points to be checked in order to determine whether the points correspond to first noise points may be reduced. That is, since only the fourth points, the number of which is smaller than the number of all first points, are checked, the time taken to determine first noise information may become shorter than when checking all of the first points.

Furthermore, whether the first points are first noise points is determined using only the second points belonging to the first noise determination region among the fourth points without the necessity to check all of the fourth points. Accordingly, since only the second points, the number of which is smaller than the number of all fourth points, are used, the time taken to determine first noise information may become much shorter than when checking all of the fourth points in order to determine the first noise points.

Furthermore, when whether the first points are first noise points is checked, the size of the first noise determination region is set in proportion to the number of fourth points. For example, when it snows heavily, the number of fourth points is increased, and thus the size of the first noise determination region is set to be large, and when it snows lightly, the number of fourth points is decreased, and thus the size of the first noise determination region is set to be small. The number of second points is in proportion to the area of the first noise determination region. In this way, the number of second points changes in proportion to the amount of snow that is falling, and whether the first points are first noise points is checked using the changed number of second points. As a result, since the number of second points is adjusted according to the amount of snow that is falling, the time taken to determine the first noise information may be further shortened.

Furthermore, whether the first points are first noise points (or second noise points) is determined using only the third points that are valid, among the second points, without the necessity to check all of the second points included in the first noise determination region (or the second noise determination region). Accordingly, since only the third points, the number of which is smaller than the number of second points, are used, the time taken to determine the first noise points (or the second noise points) may become much shorter than when checking all of the second points in order to determine the first noise points (or the second noise points).

As described above, since each of the first and second noise information is determined in the manner of removing unnecessary points from the first points acquired by the LiDAR sensor 500, the time taken to check whether points are noise points and to determine the first or second noise information may be greatly shortened.

In addition, as the sensing range of the LiDAR sensor 500 increases, the probability that noise is generated due to the LiDAR sensor 500 increases. In this case, points generated due to second noise, which inevitably occurs in the LiDAR sensor 500, are removed, whereby it is possible to improve object recognition performance without being limited by the sensing distance or the type of the LiDAR sensor 500.

As is apparent from the above description, according to the method and apparatus for tracking an object using a LiDAR sensor and the recording medium storing a program to execute the method according to the embodiments, whether points generated due to floating particles in the air or points generated due to noise occurring in the LiDAR sensor itself are noise points is determined, and clustering is performed on points other than the determined noise points, whereby it is possible to minimize deterioration in object recognition performance. In addition, since each of first and second noise information is determined in the manner of removing unnecessary points from first points acquired by the LiDAR sensor, the time taken to check whether points are noise points and to determine the first or second noise information may be greatly shortened. In addition, points generated due to sensor noise, which is increasingly likely to occur in the LiDAR sensor as the sensing range of the LiDAR sensor increases, are removed, whereby it is possible to improve object recognition performance without being limited by the sensing distance or the type of the LiDAR sensor.

However, the effects achievable through the embodiments are not limited to the above-mentioned effects, and other effects not mentioned herein will be clearly understood by those skilled in the art from the above description.

The above-described various embodiments may be combined with each other without departing from the scope of the present disclosure unless they are incompatible with each other.

In addition, for any element or process that is not described in detail in any of the various embodiments, reference may be made to the description of an element or a process having the same reference numeral in another embodiment, unless otherwise specified.

While the present disclosure has been particularly shown and described with reference to exemplary embodiments thereof, these embodiments are only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A method of tracking an object using a LiDAR sensor, the method comprising:
   determining, by an information determiner, based on a spacing distance between a target point and a valid neighboring point disposed adjacent to the target point in a same layer as the target point, among first points acquired by the LiDAR sensor, noise information indicating whether the target point is a noise point; and
   clustering, by a clustering unit including a processor, the first points using the noise information:
   wherein the determining the noise information comprises:
   (a) selecting a noise determination region in which whether the first points are noise points is to be determined;
   (b) selecting valid third points from among second points present in the noise determination region, among the first points; and
   (c) determining the noise information based on the spacing distance between the target point and the neighboring point when the neighboring point is a valid point, the target point and the neighboring point being the third points.

2. The method according to claim 1, wherein step (a) comprises determining the noise determination region according to a number of fourth points temporarily determined to be first noise points generated due to floating particles in air.

3. The method according to claim 2, wherein a size of the noise determination region is determined in proportion to the number of the fourth points.

4. The method according to claim 2, further comprising:
   determining validity of each of the first points used to select the third points in step (b);
   extracting points present in a region of interest from the first points as the fourth points;
   checking the number of the fourth points; and
   temporarily determining that the fourth points are the first noise points when a number of the extracted points is greater than a threshold number.

5. The method according to claim 4, wherein the region of interest comprises a top region, located above a host vehicle equipped with the LiDAR sensor, and a peripheral region, located near the top region.

6. The method according to claim 1, further comprising:
   determining validity of each of the first points used to select the third points in step (b),
   wherein step (a) comprises selecting, according to a type of the LiDAR sensor, the noise determination region in which whether the noise points are second noise points generated due to the LiDAR sensor is to be determined.

7. The method according to claim 2, wherein step (c) comprises:
   checking whether the neighboring point is the valid point;
   obtaining the spacing distance when the neighboring point is the valid point;
   checking whether the spacing distance is greater than a threshold distance; and
   determining the noise information indicating that the target point is the noise point when the spacing distance is greater than the threshold distance, and
   wherein step (b) and step (c) are performed on all of the second points.

8. A method of tracking an object using a LiDAR sensor, the method comprising:
   determining, by a first information determiner, based on a first spacing distance between a first target point and a valid first neighboring point disposed adjacent to the first target point in a same layer as the first target point, among first points acquired by the LiDAR sensor, first noise information indicating whether the first target point is a first noise point generated due to floating particles in air;
   determining, by a second information determiner, based on a second spacing distance between a second target point and a valid second neighboring point disposed adjacent to the second target point in a same layer as the second target point, among the first points, second noise information indicating whether the second target point is a second noise point generated due to the LiDAR sensor; and
   clustering, by a clustering unit, the first points using the first noise information and the second noise information.

9. The method according to claim 8, wherein the determining the first noise information comprises:
   (a1) selecting a first noise determination region in which whether the first points are first noise points generated due to floating particles in air is to be determined;
   (b1) selecting valid third points from among second points present in the first noise determination region, among the first points; and
   (c1) determining the first noise information based on the first spacing distance between the first target point and the first neighboring point when the first neighboring point is a valid point, the first target point and the first neighboring point being the third points.

10. The method according to claim 9, wherein the determining the first noise information further comprises:
    extracting points present in a region of interest from the first points as fourth points;
    checking a number of the fourth points; and
    temporarily determining that the fourth points are the first noise points when a number of the extracted points is greater than a threshold number.

11. The method according to claim 10, wherein step (c1) comprises:
    checking whether the first neighboring point is the valid point;
    obtaining the first spacing distance when the first neighboring point is the valid point;
    checking whether the first spacing distance is greater than a first threshold distance; and
    determining the first noise information indicating that the first target point is the first noise point when the first spacing distance is greater than the first threshold distance, and
    wherein step (b1) and step (c1) are performed on all of the second points.

12. The method according to claim 8, wherein the determining the second noise information comprises:
    (a2) selecting a second noise determination region in which whether the first points are second noise points generated due to the LiDAR sensor is to be determined;
    (b2) selecting valid third points from among second points present in the second noise determination region, among the first points; and
    (c2) determining the second noise information based on the second spacing distance between the second target point and the second neighboring point when the second neighboring point is a valid point, the second target point and the second neighboring point being the third points.

13. The method according to claim 9, further comprising:
    determining validity of each of the first points used to select the third points.

14. The method according to claim 12, wherein step (c2) comprises:
    checking whether the second neighboring point is the valid point;
    obtaining the second spacing distance when the second neighboring point is the valid point;
    checking whether the second spacing distance is greater than a second threshold distance; and
    determining the second noise information indicating that the second target point is the second noise point when the second spacing distance is greater than the second threshold distance, and
    wherein step (b2) and step (c2) are performed on all of the second points.

15. The method according to claim 8, wherein the second noise information is determined with respect to a point other than a point determined to be the first noise point, among the first points.

16. The method according to claim 8, wherein the first noise information is determined with respect to a point other than a point determined to be the second noise point, among the first points.

17. An apparatus for tracking an object using a LiDAR sensor, the apparatus comprising:
    an information determiner configured to determine, based on a spacing distance between a target point and a valid neighboring point disposed adjacent to the target point in a same layer as the target point, among first points acquired by the LiDAR sensor, noise information indicating whether the target point is a noise point; and
    a clustering unit including a processor and configured to cluster the first points using the noise information;
    wherein the information determiner is further configured to:
        select a noise determination region in which whether the first points are noise points is to be determined;
        select valid third points from among second points present in the noise determination region, among the first points; and
        determine the noise information based on the spacing distance between the target point and the neighboring point when the neighboring point is a valid point, the target point and the neighboring point being the third points.

18. An apparatus for tracking an object using a LiDAR sensor, the apparatus comprising:
    a first information determiner configured to determine, based on a first spacing distance between a first target point and a valid first neighboring point disposed adjacent to the first target point in a same layer as the first target point, among first points acquired by the LiDAR sensor, first noise information indicating whether the first target point is a first noise point generated due to floating particles in air;
    a second information determiner configured to determine, based on a second spacing distance between a second target point and a valid second neighboring point disposed adjacent to the second target point in a same layer as the second target point, among the first points, second noise information indicating whether the second target point is a second noise point generated due to the LiDAR sensor; and
    a clustering unit including a processor and configured to cluster the first points using the first noise information and the second noise information.

19. A non-transitory computer-readable recording medium in which a program for executing a method of tracking an object using a LiDAR sensor is recorded, the recording medium storing a program to implement:
    a function of determining, based on a spacing distance between a target point and a valid neighboring point disposed adjacent to the target point in a same layer as the target point, among first points acquired by the LiDAR sensor, noise information indicating whether the target point is a noise point; and
    a function of clustering the first points using the noise information;
    wherein the function of determining the noise information comprises:

selecting a noise determination region in which whether the first points are noise points is to be determined;

selecting valid third points from among second points present in the noise determination region, among the first points; and determining the noise information based on the spacing distance between the target point and the neighboring point when the neighboring point is a valid point, the target point and the neighboring point being the third points.

20. A non-transitory computer-readable recording medium in which a program for executing a method of tracking an object using a LiDAR sensor is recorded, the recording medium storing a program to implement:

a function of determining, based on a first spacing distance between a first target point and a valid first neighboring point disposed adjacent to the first target point in a same layer as the first target point, among first points acquired by the LiDAR sensor, first noise information indicating whether the first target point is a first noise point generated due to floating particles in air;

a function of determining, based on a second spacing distance between a second target point and a valid second neighboring point disposed adjacent to the second target point in a same layer as the second target point, among the first points, second noise information indicating whether the second target point is a second noise point generated due to the LiDAR sensor; and a function of clustering the first points using the first noise information and the second noise information.

* * * * *